United States Patent
Boche et al.

(10) Patent No.: US 11,971,708 B2
(45) Date of Patent: Apr. 30, 2024

(54) METHOD FOR PROVIDING CONTEXT BASED ARTEFACT ACCESS

(71) Applicant: SIEMENS AKTIENGESELLSCHAFT, Munich (DE)

(72) Inventors: Maik Boche, Oberasbach (DE); Stefan Burger, Munich (DE); Ankit Singh, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 699 days.

(21) Appl. No.: 17/252,262

(22) PCT Filed: Jun. 14, 2019

(86) PCT No.: PCT/EP2019/065640
§ 371 (c)(1),
(2) Date: Dec. 14, 2020

(87) PCT Pub. No.: WO2019/238907
PCT Pub. Date: Dec. 19, 2019

(65) Prior Publication Data
US 2021/0255612 A1    Aug. 19, 2021

(30) Foreign Application Priority Data
Jun. 15, 2018   (EP) ..................... 18177980

(51) Int. Cl.
*G05B 19/418*    (2006.01)
*G06F 16/22*    (2019.01)

(52) U.S. Cl.
CPC ....... *G05B 19/41885* (2013.01); *G06F 16/22* (2019.01); *G05B 2219/35055* (2013.01)

(58) Field of Classification Search
CPC .... G05B 19/41885; G05B 2219/35055; G06F 16/22; G06Q 10/06
See application file for complete search history.

(56) References Cited

U.S. PATENT DOCUMENTS 10,509,907 B2 *   12/2019   Shear ..................... G06F 21/31
11,431,697 B2 *   8/2022   Parekh .................... H04L 63/08
(Continued)

OTHER PUBLICATIONS

International Preliminary Report on Patentability for International Patent Application PCT/EP2019/065640 dated Sep. 22, 2020.
(Continued)

*Primary Examiner* — Angelica Ruiz
(74) *Attorney, Agent, or Firm* — Lempia Summerfield Katz LLC

(57) ABSTRACT

A method for providing context based artefact access to tenants of a cloud computing system includes receiving a request to access an artefact deployed on the cloud computing system. The request includes a tenant identifier and an artefact identifier. Context data associated with the artefact is determined based on the tenant identifier. Context data associated with the artefact is retrieved from an artefact repository stored in a database of the cloud computing system. Access to the artefact is provided based on the retrieved context data associated with the artefact on a device associated with the tenant.

13 Claims, 2 Drawing Sheets

(56) References Cited

U.S. PATENT DOCUMENTS

| | | | |
|---|---|---|---|
| 2013/0073387 A1* | 3/2013 | Heath | G06Q 30/02 |
| | | | 705/14.53 |
| 2013/0103384 A1* | 4/2013 | Hunter | G06F 9/454 |
| | | | 704/3 |
| 2014/0336795 A1* | 11/2014 | Asenjo | G05B 19/4083 |
| | | | 700/86 |
| 2016/0156671 A1* | 6/2016 | Cabrera | H04L 63/20 |
| | | | 726/1 |
| 2017/0115976 A1* | 4/2017 | Mills | G06Q 10/06 |
| 2017/0351226 A1 | 12/2017 | Bliss | |

OTHER PUBLICATIONS

International Search Report and the Written Opinion for International Patent Application PCT/EP2019/065640 dated Jul. 15, 2019.

* cited by examiner

METHOD FOR PROVIDING CONTEXT BASED ARTEFACT ACCESS

This application is the National Stage of International Application No. PCT/EP2019/065640, filed Jun. 14, 2019, which claims the benefit of European Patent Application No. EP 18177980.2, filed Jun. 15, 2018. The entire contents of these documents are hereby incorporated herein by reference.

BACKGROUND

The present embodiments relate to providing context based artefact access to tenants of a cloud computing system that enables end to end management of artefacts that are used to access cloud services.

A cloud computing system may enable the development, validation, deployment, and/or provisioning of artefacts. These artefacts may, for example, include software applications APIs, digital twin data models, firmware, and so on. Tenants may use the artefacts for commission, monitoring, controlling, and/or maintaining industrial facilities. An industrial facility may include a plurality of assets or components (e.g., hardware and/or software components that are connected or assembled to form the industrial facility). An industrial facility or industrial plant may include a plurality of sub-systems that consist themself of components in a hierarchical structure.

US 2017/0351226 A1 relates to a cloud-based diagnosis and maintenance system that facilitates discovery and indexing of plant-wide data residing on various data platforms across multiple industrial facilities. The system includes an indexing system that automatically inventories industrial devices and other data sources located throughout the facilities, and identifies available data items on each data source. Further, the system uses a federated data model, and the system uses a data history, inventory information, and location data as well as configuration data.

With a growing number of assets connected to the cloud computing system, the cloud computing system is to host a plurality of artefacts. Consequently, the management of artefacts become increasingly difficult.

SUMMARY AND DESCRIPTION

The scope of the present invention is defined solely by the appended claims and is not affected to any degree by the statements within this summary.

There is a need to provide a method and an apparatus for managing context data related to artefacts of assets of an industrial facility.

The present embodiments may obviate one or more of the drawbacks or limitations in the related art. For example, an apparatus and a method for a cloud computing system providing a more efficient management of context data related to artefacts of assets of an industrial facility are provided.

The present embodiments provide, according to a first aspect, a method for providing context based artefact access to tenants of a cloud computing system. The method includes the acts of: receiving a request to access an artefact deployed on the cloud computing system, where the request includes a tenant identifier and an artefact identifier. Context data (CD) associated with the artefact is provided based on the tenant identifier. Context data (CD) associated with the artefact is identified from an artefact repository stored in a database of the cloud computing system. Access to the artefact is provided based on the retrieved context data (CD) associated with the artefact on a device associated with the tenant. The context data is linked to artefacts of assets of at least one industrial facility represented by entities of a structured asset data model (ADM) of the respective industrial facility stored in a database of the cloud computing system. The asset data model (ADM) of the industrial facility reflects a hierarchical structure and topology of the industrial facility. The artefacts of the assets include cloud applications, digital twin data models, or firmware used for commission, monitoring, controlling, and/or maintaining of the respective assets of the industrial facility.

In a possible embodiment of the method according to the first aspect of the present embodiments, the context delivery service (CDS) is provided by the cloud computing system via a context delivery service API.

In a still further possible embodiment of the method, the entities of the structured asset data model (ADM) of the at least one industrial facility are enriched with meta data and/or with context data, linked by the context delivery service (CDS) to the respective entities of the structured asset data model (ADM) of the industrial facility.

In a further possible embodiment of the method according to the first aspect of the present embodiments, user devices are connected via a network to a cloud interface of the cloud computing system to upload context data from the user device to the cloud computing system linked automatically by the context delivery service of the cloud computing system to corresponding entities of the structured asset data model (ADM) stored in the database of the cloud computing system.

In a still further possible embodiment of the method according to the first aspect of the present embodiments, the user devices are connected via the network to a cloud interface of the cloud computing system to download context data of entities of the structured asset data model (ADM) stored in the database of the cloud computing system to the user device selected by the context delivery service (CDS) in response to a received query, Q.

In a further possible embodiment of the method according to the first aspect of the present embodiments, the context data linked to an artefact belonging to an asset represented by an associated entity in the structured asset data model (ADM) of the industrial facility includes information data with respect to the industrial facility itself and/or with respect to the structured asset data model (ADM) of the industrial facility stored in the database of the cloud computing system.

In a further possible embodiment of the method according to the first aspect of the present embodiments, the structured asset data model (ADM) includes an ontological asset model.

In a still further possible embodiment of the model according to the first aspect of the present embodiments, the context data includes text documents and/or image data and/or audio data providing information about specific assets assembled in the industrial facility and/or the industrial facility itself (e.g., a location and/or purpose of the respective asset or the industrial facility, regional settings including regional languages, countries, time zones, used metrics, and/or technical standards).

In a further possible embodiment of the method according to the first aspect of the present embodiments, context data is input by a user using a user interface of a user device connected via the network to the cloud computing system and uploaded to the cloud computing system by the user device via the network.

In a still further possible embodiment of the method according to the first aspect of the present embodiments, the context data is retrieved by the user device from a local memory integrated in the respective asset or industrial facility and uploaded by the user device via the network to the cloud computing system.

In a still further possible embodiment of the method according to the first aspect of the present embodiments, the context data linked to the artefacts is stored in the database of the cloud computing system in encrypted form and/or in separate storage spaces for different industrial facilities and/or tenants.

In a still further possible embodiment of the method according to the first aspect of the present embodiments, the context delivery service (CDS) provides a workflow for handling information data depending on a current status of the context data.

In a still further possible embodiment of the method according to the first aspect of the present embodiments, the context delivery service (CDS) transform automatically context data linked to artefacts of assets of the industrial facility depending on a current location of the user device submitting a query, Q, and/or depending on a location of the industrial facility.

In a still further possible embodiment of the method according to the first aspect of the present embodiments, the transformation module of the context delivery service (CDS) is adapted to translate context data automatically from a source language into a target language depending on a detected current location of the user device and/or depending on a user profile of the user.

The present embodiments further provide, according to a second aspect, a context delivery engine.

The present embodiments provide, according to the second aspect, a context delivery engine for a cloud computing system, where the context delivery engine includes a processor adapted to provide a context delivery service linking context data to artefacts of assets of at least one industrial facility represented by entities of a structured asset data model of the respective industrial facility stored in a database of the cloud computing system. The context data (CD) is linked by a context delivery service (CDS) to the artefacts of the assets of the at least one industrial facility represented by the entities of the structured asset data model (ADM) of the respective industrial facility stored in the database of the cloud computing system. The asset data model (ADM) of the industrial facility reflects a hierarchical structure and topology of the industrial facility. The artefacts of the assets include cloud applications, digital twin data models, or firmware used for commission, monitoring, controlling, and/or maintaining of the respective assets of the industrial facility.

DETAILED DESCRIPTION

Figure 1:
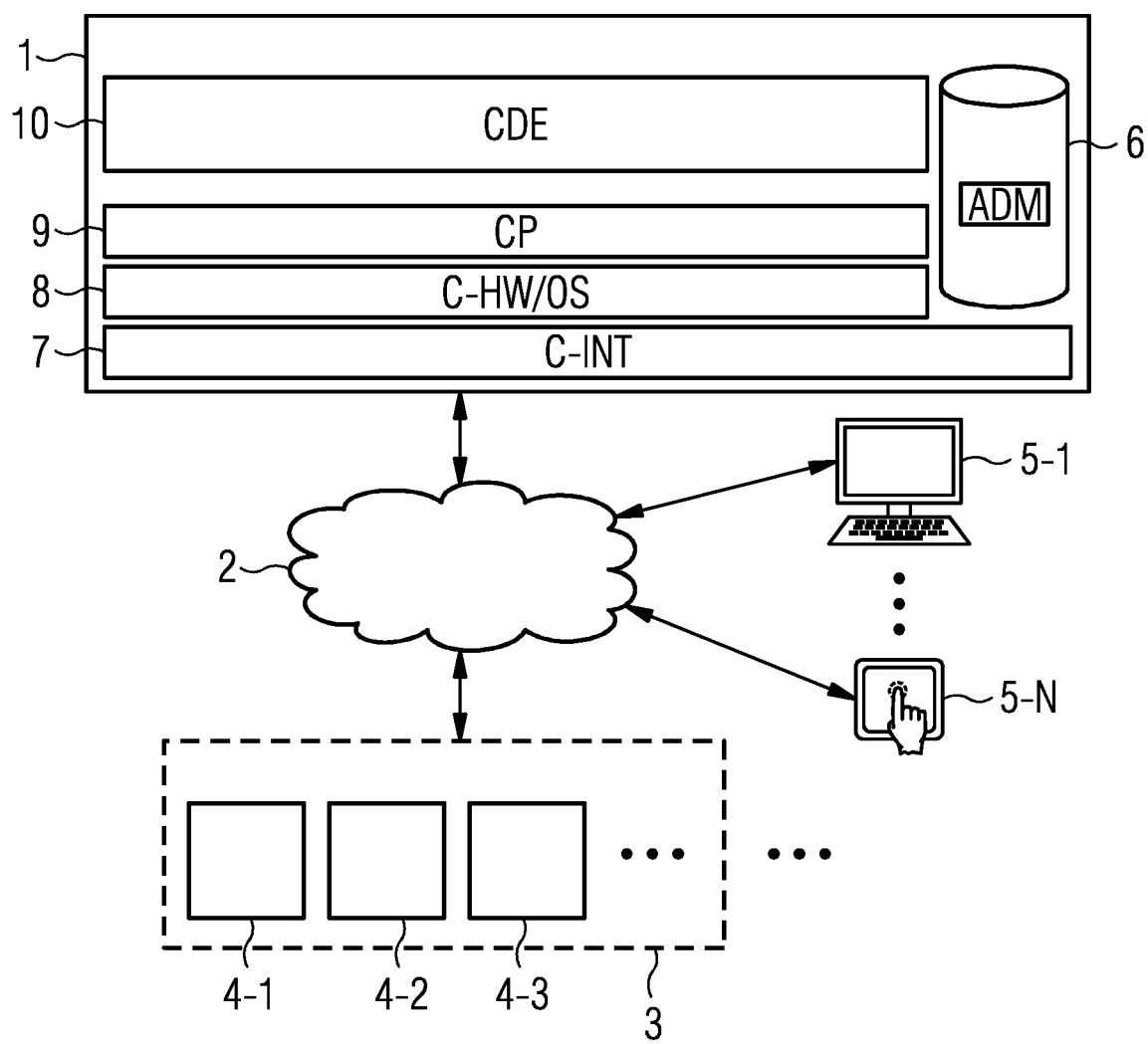
FIG. 1 shows a block diagram of a possible exemplary embodiment of a cloud computing system including a context delivery engine according to an aspect of the present embodiments.

As shown in the block diagram of FIG. 1, a cloud computing system 1 may be connected via a network 2 to one or more industrial facilities 3. Each industrial facility 3 may include a plurality of assets 4-1, 4-2, 4-3, ... including sub-systems. The sub-systems include hardware and/or software components. User devices 5-1, ..., 5-$n$ of different users or tenants may also be connected via the network 2 to the cloud computing system 1, as illustrated in FIG. 1. The user devices 5 may be portable user devices including laptops or tablets, as shown in FIG. 1. The user devices 5 may also include fixed terminals connected to the network 2. The cloud computing system 1 may include at least one database or repository 6. In the illustrated embodiment of FIG. 1, the cloud computing system 1 includes a cloud interface 7 for exchanging data via the network 2 with the user devices 5-$i$ and possibly with controllers of the industrial facility 3. In the illustrated block diagram, the cloud computing system 1 includes a cloud hardware with an operating system OS represented by block 8 illustrated in FIG. 1. Further, the cloud computing system 1 provides a cloud platform 9, as shown in FIG. 1. Further, a context delivery engine 10 according to an aspect of the present embodiments also forms also of the cloud computing system 1.

The context delivery engine 10 is provided for managing context data related to artefacts of assets within the industrial facility 3. The context delivery engine 10 of the cloud computing system 1 is adapted to provide a context delivery service (CDS) that may be used to link context data to artefacts of assets of the at least one industrial facility 3 represented by entities of a structured asset data model (ADM) of the respective industrial facility 3 stored in the database 6 of the cloud computing system 1. The provided context delivery service CDS may include a context delivery service CDS API. The context delivery service CDS may enable the user or tenant to add context information or context data to artefacts such as a cloud application to be deployed on a cloud platform via APIs. The artefacts of the assets 4 of the industrial facility 3 may include, for example, cloud applications, digital twin data models, or firmware used, for example, for commission, monitoring, controlling, and/or maintaining or repairing the respective assets of the industrial facility 3.

Figure 2:
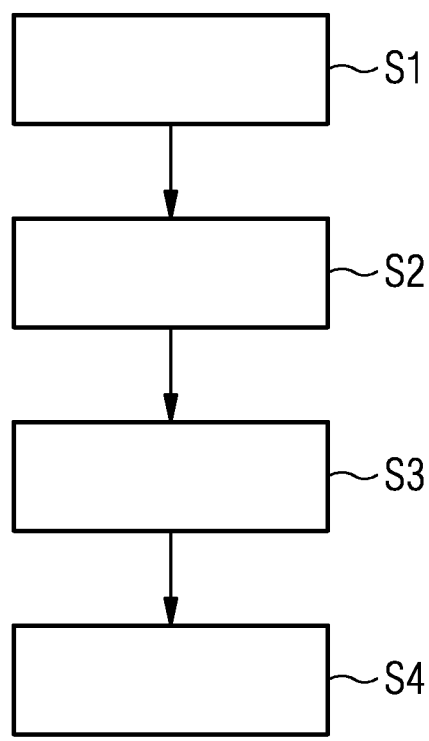
FIG. 2 shows a flowchart of a possible exemplary embodiment of a method for providing context based artefact access to tenants of a cloud computing system according to an aspect of the present embodiments.

FIG. 2 shows a flowchart of a possible exemplary embodiment of a method for providing context based artefact access to tenants of a cloud computing system according to an aspect of the present embodiments. In the illustrated exemplary embodiment, the method includes four main acts.

In a first act S1, a request to access an artefact deployed on the cloud computing system 1 is received. The received request includes a tenant identifier and an artefact identifier.

In the next act S2, context data associated with the artefact is determined based on the tenant identifier of the received request.

In a further act S3, context data associated with the artefact is retrieved from the artefact repository stored in the database of the cloud computing system.

In a further act S4, access to the artefact is provided based on the received context data associated with the artefact on a device associated with the tenant.

The structured asset data model (ADM) of the industrial facility 3 may include, in a possible embodiment, an ontological asset model. The asset data model (ADM) of the industrial facility 3 may reflect a hierarchical structure and topology of the industrial facility 3. In a possible embodiment, entities of the structured asset data model (ADM) of the industrial facility 3 may be enriched with meta data and/or with context data linked by the context delivery service CDS to the respective entities of the structured asset data model (ADM) of the industrial facility 3.

An asset data model (ADM) that may already exist for an industrial facility 3 is used to provide a sophisticated context delivery system (CDS) providing context based artefact access to tenants of the cloud computing system 1. This may be achieved by linking artefacts to entities of the ADM representing real assets 4 of the physical industrial facility 3.

The devices 5-I, as illustrated in FIG. 1, may be connected via the network 2 to the cloud interface 7 of the cloud computing system 1 to upload context data from the user device to the cloud computing system 1, where the uploaded context data is automatically linked by the context delivery service CDS provided by the context delivery engine 10 of the cloud computing system 1 to corresponding entities of the structured asset data model (ADM) stored in the database 6 of the cloud computing system 1. Further, the devices 5-i may be used to download context data of entities of the structured asset data model (ADM) stored in the database 6 of the cloud computing system 1 in response to a query Q submitted by a tenant through his device 5 via the network 2 to the cloud computing system 1. The cloud computing system 1 may include a query engine including a processor adapted to process the structured asset data model (ADM) stored in the database 6 in response to the received query Q to provide matching context data linked to the respective entities in the structured asset data model (ADM) specified in the received query, Q. For example, a technician working in the field to perform a maintenance procedure may request, in a query Q, to get for a specific asset 4 (e.g., a valve) of a machine within an industrial facility located in a specific country (e.g., Saudi Arabia) context (e.g., a service guide).

The context data linked to the artefact belonging to an asset represented by an associated entity in the structured asset data model (ADM) of the industrial facility may include information data with respect to the industrial facility 3 itself and/or with respect to the structured asset data model of the industrial facility 3 stored in the database 6 of the cloud computing system 1. The context information or context data may include, for example, documents (e.g., specification of a motor), images, location information, language information, etc. Accordingly, a tenant may understand an effect if the tenant makes use of the artefact based on the associated context information of the artefact. In a possible embodiment, the asset data model (ADM) may be automatically derived from a knowledge graph representing relations between assets of the facility. The knowledge graph may be stored in the database 6 of the system 1. The knowledge graph includes nodes and edges. The nodes may represent assets (e.g., components) of subsystems of the facility 3. The edges of the knowledge graph represent relations, such as contain relations, part of relationship, etc.

The context data may include text documents and/or image data and/or audio data providing information about specific assets 4-i within the industrial facility 3 or of the industrial facility 3 itself. Context data may provide information (e.g., about a location and/or purpose of an asset of the industrial facility 3 or of the whole industrial facility 3). The context data may include regional settings including regional languages, countries, time zones, used metrics, and/or used technical standards. In a possible embodiment, context data may be input by a tenant by the user interface of a corresponding device 5-i connected via the network 2 of the cloud computing system 1. The input context data is uploaded to the cloud computing system 1 and may be linked by the context delivery service (CDS) provided by the context delivery engine 10 automatically to artefacts of assets 4 represented by entities (e.g., nodes or blocks) of the structured asset data model (ADM). It is also possible that context data may be retrieved by a device 5-i from a local memory integrated in the respective asset 4 or industrial facility 3 and then uploaded to the cloud computing system 1. In one embodiment, the context data linked to the artefacts may be encrypted using a symmetric or asymmetric encryption process and then stored in the database 6 of the cloud computing system 1 in encrypted form. Further, it is possible that the context data linked to the artefacts of the assets are stored in separate storage spaces for different industrial facilities and/or tenants.

The context delivery service CDS provided by the context delivery engine 10 of the cloud computing system 1 may be enabled by the cloud platform 9 via an API. The context delivery service (CDS) may be configured to import asset structures and/or internet of things (IoT) data models to create a structured content. It is possible for the user to add meta data to the stored content to make data available for different use cases. In one embodiment, the data is stored securely in encrypted form in a cloud platform database.

In a possible embodiment, a workflow module may be provided to handle different status of context data (e.g., context documents). These different status may, for example, indicate whether the respective document has been published, is in review, or has been translated.

Figure 3:
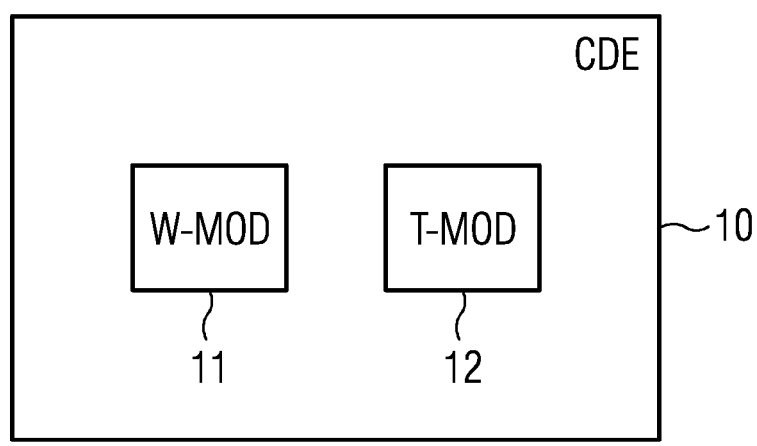
FIG. 3 shows a schematic block diagram of a possible exemplary embodiment of a context delivery engine according to the present embodiments.

As illustrated in the exemplary embodiment of FIG. 3, the context delivery engine 10 may include a workflow module 11 adapted to provide a workflow for handling information data depending on a current status of the context data. In the illustrated embodiment of FIG. 2, the context delivery engine 10 further includes a transformation module 12 adapted to automatically transform context data linked to artefacts of assets of the industrial facility 3 depending on a current location of a user or tenant device 5-i submitting a query Q to the context delivery engine 10 and/or depending on the location of the industrial facility 3. In a possible embodiment, the transformation module 12 is adapted to translate context data automatically from a source language into a target language depending on a detected current location of the user device 5 and/or depending on a user profile of the respective user submitted the query Q.

With the system according to the present embodiments, it is possible to enrich assets or IoT model entities using, for example, regional settings like countries, languages, metrics, etc. It is possible to localize content like UI terms or documentation using translation APIs. In a further embodiment, the cloud computing system 1 further includes a search engine adapted to search for documents or content using the context delivery service CDS offered by the context delivery engine 10. It is possible to connect application data to CDS content using the context delivery engine 10. The system 1 provides user interfaces to manage context data. The system 1 provides a storage and management platform that may be used to localize data such as contracts, documentation offering details of providers, or notification templates. Further, the context delivery service CDS may provide regional information such as date or time or regional details concerning the artefacts. It is possible to create an individual meta data set that is used by the context delivery service CDS to provide contextual links to contextual content values. The system 1 may use ontological data models to create a data set that fits a specific industry, industrial plant, and/or system-based structure. The cloud platform 9 of the cloud computing system 1 may provide in a possible embodiment customized downloadable objects such as documents, IoT data, etc. specific to a context. The developer may enrich an application with multilingual content during development on the cloud platform 9 of the system.

Further, a provider of an application may provide a version of a content for offerings (e.g., sales information, offerings data, or multilingual text). The provider may further provide auditable information in the respective application and may use standardized regional data for offerings.

A provider may add IoT data to additional content such as service documents or configurations. The provider may, in a possible embodiment, provide tenants with IoT data and contextualized documents. The provider may be informed about other mindsphere services to enhance productivity in a specific context including a country, state, or city, etc. The provider may offer any service such as an emergency maintenance service for the industrial facility to customers in a particular region (e.g., where the context data indicates the country, state, city, etc.).

The service provider may collaborate with customers and colleagues to align information data or content data such as document review processes and acceptance. The provider may add additional languages or publish IoT data.

The tenant has the possibility to store his information and documents securely and possibly encrypted in the database 6 of the system 1.

The cloud platform 9 provides, in a possible embodiment, a context delivery service API that enables a user or tenant to link additional documents, data, multimedia assets, or any other content to enrich asset data, IoT model entities, or application features to artefacts, and thereafter, having a secured access to the context information during execution of an application.

The context delivery service CDS provided by the context delivery engine 10 of the cloud computing system 1 may provide separate storage spaces for tenants with strong privacy concerns. The context delivery service CDS allows to download contents based on the context data. Further, the context delivery service CDS may provide for a firmware update based on different target groups such as firmware update with different settings and meta data versions as for different countries. The context delivery service CDS may provide IoT data mappings to version documents like meta data, asset documentation, or firmware versions. The system 1 also facilitates tenants administration for sales of versioned IoT time series data to other interested parties. The time series data may be generated by a sensor asset of the industrial facility 3.

Auditable data or documents like saving analytics results such as daily energy consumption of some assets on different location, settings, meta data, and/or firmware may be provided by the context delivery service CDS.

Further, the context delivery service CDS provided by the context delivery engine 10 may provide for contextual maintenance services like negotiating services based on assets geolocation for urgent maintenance of the assets. The pre-condition is that the respective service provider is registered with the cloud computing system 1.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for providing context based artefact access to tenants of a cloud computing system, the method comprising:
   receiving a request to access an artefact deployed on the cloud computing system, wherein the request comprises a tenant identifier and an artefact identifier;
   determining context data associated with the artefact based on the tenant identifier;
   retrieving context data associated with the artefact from an artefact repository stored in a database of the cloud computing system;
   providing access to the artefact based on the retrieved context data associated with the artefact on a device associated with the tenant, wherein a context delivery service is provided by the cloud computing system, wherein context data is linked by the context delivery service to artefacts of assets of at least one industrial facility represented by a structured asset data model of the respective industrial facility stored in the database of the cloud computing system, the structured asset data model of the respective industrial facility reflecting a hierarchical structure and topology of the respective industrial facility, and wherein the artefacts of the assets comprise cloud applications, digital twin data models, or firmware used for commission, monitoring, controlling, maintaining, or any combination thereof of the respective assets of the respective industrial facility;
   connecting user devices via a network to a cloud interface of the cloud computing system;
   uploading context data from the user device to the cloud computing system linked automatically by the context delivery service of the cloud computing system to corresponding entities of the structured asset data model stored in the database of the cloud computing system; and
   downloading context data of entities of the structured asset data model stored in the database of the cloud computing system to the user device selected by the context delivery service in response to a received query.

2. The method of claim 1, wherein the context delivery service is provided by the cloud computing system via a context delivery service.

3. The method of claim 1, wherein entities of the structured asset data model of the at least one industrial facility are enriched with meta data, with context data linked by the context delivery service to the respective entities of the structured asset data model of the respective industrial facility, or with a combination thereof.

4. The method of claim 1, wherein the context data linked to an artefact belonging to an asset represented by an associated entity in the structured asset data model of the respective industrial facility comprises information data with respect to the respective industrial facility, with respect to the structured asset data model of the respective industrial facility stored in the database of the cloud computing system, or with respect to a combination thereof.

5. The method of claim 1, wherein the structured asset data model comprises an ontological asset model.

6. The method of claim 1, wherein the context data comprises text documents, image data, audio data, or any combination thereof providing information about specific assets assembled in the respective industrial facility, about the industrial facility, or about a combination thereof.

7. The method of claim 6, wherein the information includes:
- a location, purpose, or location and purpose of the respective asset or the respective industrial facility;
- regional settings including regional languages, countries, time zones, used metrics, technical standards, or any combination thereof; or
- a combination thereof.

8. The method of claim 1, wherein context data is input by a user using a user interface of a user device connected via the network to the cloud computing system and uploaded to the cloud computing system, retrieved by the user device from a local memory integrated in the respective asset or the respective industrial facility, or a combination thereof.

9. The method of claim 1, wherein context data linked to the artefacts is stored in the database of the cloud computing system in encrypted form, in separate storage spaces for different industrial facilities, tenants, or industrial facilities and tenants.

10. The method of claim 1, wherein the context delivery service provides a workflow for handling information data depending on a current status of the context data.

11. The method of claim 1, wherein the context delivery service automatically transforms context data linked to artefacts of assets of the industrial facility depending on a current location of a user device submitting a query, depending on the location of the industrial facility, or depending on a combination thereof.

12. The method of claim 11, wherein the context delivery service is adapted to translate context data automatically from a source language into a target language depending on a detected current location of the user device, depending on a user profile of the user, or depending on a combination thereof.

13. A context delivery engine for a cloud computing system, wherein the context delivery engine comprises:
- a processor configured to:
  - provide a context delivery service linking context data to artefacts of assets of at least one industrial facility represented by entities of a structured asset data model of the respective industrial facility stored in a database of the cloud computing system,
- wherein the context data is linked by a context delivery service to the artefacts of the assets of the at least one industrial facility represented by the entities of the structured asset data model of the respective industrial facility stored in the database of the cloud computing system, the asset data model of the respective industrial facility reflecting a hierarchical structure and topology of the industrial facility,
- wherein the artefacts of the assets comprise cloud applications, digital twin data models, or firmware used for commission, monitoring, controlling, maintaining, or any combination thereof of the respective assets of the respective industrial facility, and
- wherein user devices are connected via a network to a cloud interface of the cloud computing system to upload context data from the user device to the cloud computing system linked automatically by the context delivery service of the cloud computing system to corresponding entities of the structured asset data model stored in the database of the cloud computing system, download context data of entities of the structured asset data model stored in the database of the cloud computing system to the user device selected by the context delivery service in response to a received query, or a combination thereof.

* * * * *